3,093,608
MOLDING COMPOSITION COMPRISING AMINOPLAST RESIN AND CYCLIC SULPHITE AND METHOD OF PREPARING SAME

Corwyn Philip Vale, Brierley Hill, and Sidney Gutter and Walter Wilson, Birmingham, England; said Gutter now by change of name Sidney Goodman, assignors to British Industrial Plastics Limited, London, England, a company of Great Britain
No Drawing. Filed Oct. 9, 1959, Ser. No. 845,317
Claims priority, Great Britain Oct. 17, 1958
11 Claims. (Cl. 260—17.3)

The present invention is concerned with aminoplastic moulding compositions and particularly accelerators therefor.

Hot press moulding compositions containing an aminoplastic resin and an inert filler have been well-known commercially for a number of years. It is also well-known that such compositions require the addition of acidic or potentially acidic substances to accelerate the curing process so that articles may be moulded rapidly and economically. An ideal accelerator would be a compound completely inert at temperatures below about 150° F. but, at moulding temperatures (260-340° F.), producing acidity rapidly and efficiently, thus providing a very rapid cure while enabling the moulding composition to be stored indefinitely under normal temperature conditions without loss of flow in the mould.

The present invention employs as accelerators a class of compounds, not hitherto suggested for the purpose, which approach this ideal to a considerable extent. The class consists of the cyclic sulphites obtainable by the reaction of thionyl chloride and certain compounds containing two or more hydroxyl groups per molecule. This will now be further explained.

Under controlled conditions, simple alpha glycols, such as ethylene glycol, 1:2-pyroplene glycol, 2:3-butylene glycol, and higher homologues, react with thionyl chloride to give sulphites in which the group

forms part of a five-membered ring. Such sulphites are very stable, decomposing only slightly, if at all, on boiling under atmospheric pressure and hydrolysing only very slowly in neutral solution. Introduced into aminoplastic moulding compositions, however, they act as powerful accelerators giving materials with a very rapid rate of cure while maintaining good storage life. The reason for this is not fully understood, although it is known that the decomposition temperature of cyclic sulphites is lowered by the presence of certain compounds containing amine groups. Under similar circumstances, sulphites derived from monohydric alcohols, such as diethyl sulphite or di-n-butyl sulphite are not effective accelerators.

Cyclic sulphites, useful for the purpose of the invention, can equally well be made from compounds containing more than two hydroxyl groups per molecule. Erythritol gives a bicyclic sulphite which is a satisfactory accelerator.

When the hydroxyl groups are attached to carbon atoms separated from one another in the molecule by one or more carbon atoms, cyclic sulphites are more difficult to prepare and are usually contaminated with other products. Six-membered sulphite rings can be made, however, and compounds containing these are good accelerators. Thus, pentaerythritol gives a dicyclic sulphite—a stable white powder melting at 152° C.—which can be used as an accelerator according to the invention.

Cyclic sulphites, useful for the invention, can also be obtained from polyhydroxy compounds which have been partially etherified or esterified. Thus, there may be used mono-ethers or mono-esters of glycerol.

The term "aminoplastic resin" is used herein in accordance with the definition given on page 12 of B.S. 1755 (1951). It therefore means the reaction products (at any stage of condensation) of an aldehyde, particularly formaldehyde, with urea, thiourea, melamine or allied compounds e.g. cyanamide polymers, diaminotriazines, acetoguanamine and benzoguanamine.

The inert filler in the moulding composition, containing the new kind of accelerator according to the invention, may be of any known or customary type, including organic fillers, such as, for example, cellulose, regenerated cellulose, cellulose esters, cellulose ethers in substantially purified form or as a natural product or residue, such as, for example, wood flour and sisal, and inorganic fillers, such as, for example, asbestos, silica, talc, asbestine, china clay, and glass fibres. There may be included in the moulding composition, without detriment, various of the customary minor additive, such as, for example, mould lubricants, stabilisers and pigments.

As regards the amount of accelerator to be used, this may depend on the particular nature of the cyclic sulphite, of the resin and of the filler. Certain aminoplastic resins, e.g. benzoguanamine resins, are slower in curing and may therefore require a correspondingly larger amount of accelerator. Further, certain fillers, e.g. some grades of asbestos, have an alkalinity and require more accelerator because some of the accelerator will be taken up in neutralising such alkalinity. As regards this point, however, there may be used another type of accelerator in an amount sufficient or nearly sufficient to neutralise the alkalinity of the filler so that an extra amount of cyclic sulphite accelerator for performing that function will be unnecessary.

Normally at least 0.1% of the cyclic sulphite accelerator based on the dry weight of the moulding composition will be necessary, and not more than 5% or possibly 10%, but usually not more than about 2%.

The ratio of resin to filler may vary, as is well known in the art, within wide limits. Cellulose filled urea-formaldehyde and melamine-formaldehyde moulding powders usually contain 65–75% resin with 35–25% filler but may contain as much as 80% resin or as little as 50% resin. Mineral filled moulding powders usually contain much less resin e.g. 20–50%. Mixed fillers of the aforesaid types may be used with resin contents dependent on the relative proportions of the respective types of filler.

It should here be mentioned that although normally the aminoplastic moulding compositions according to the invention will comprise a filler, it is possible in some instances to provide a useful moulding composition containing no fillers. This is the case, for example, when the resin is a melamine-formaldehyde resin because the cyclic sulphite accelerator may be added to the resin syrup and dried down with it to give an unfilled material which can be hot-pressed to give clear mouldings, e.g. buttons, or opalescent mouldings if there is added a small amount of a substance which imparts opalescence.

The following examples are given for the purpose of illustrating the invention, the parts mentioned being parts by weight and the pressures used for moulding being within the range of 2–3 tons per square inch:

Example 1

An aqueous urea-formaldehyde precondensate was prepared by dissolving 800 parts urea in 1622 parts neutral formalin (37% formaldehyde w./w.). The solution was heated to 60° C. and held at this temperature for 30 minutes. The syrup was filtered, cooled and to it was added with stirring 5 parts ethylene sulphite and 10 parts hexamethylene tetramine.

The syrup was mixed with 660 parts alpha cellulose in a Werner-Pfleiderer type mixer until a fine, homogeneous crumb was obtained. The wet crumb was transferred to trays which were then placed in a thermostatically controlled oven fitted with an air-circulating fan. The mixer was dried out at 80° C. until just dry to the touch and brittle. The dry material was then placed in a pebble-mill with an addition of 10 parts zinc stearate and ground in the usual way. The fine powder was granulated by passing once through the nip of a pair of differential rolls maintained at 110° C.

The granular product had an easy flow and cured rapidly. A thin beaker was obtained blister-free after 20 second cure at 300° F. Water absorption discs ⅛" thick 2" diameter (B.S. 1322) were obtained fully cured after one minute at the same temperature.

*Example 2*

A sample of 1:2-propylene sulphite was prepared as follows by a procedure described by W.W. Carlson and L. H. Cretcher in the Journal of the American Chemical Society 1947, 69, page 1952.

76 parts 1:2-propylene glycol (one mol) were placed in reaction vessel fitted with stirrer, thermometer, dropping funnel and gas outlet. 119 parts thionyl chloride were divided into two portions of 30 and 89 parts. The first portion was added to the glycol dropwise with stirring and cooling to maintain the temperature between 35° C. and 40° C. The other portion was then added slowly, heat now being applied to keep the mix within the same temperature range. When addition of the thionyl chloride was complete, the mixture was heated to 70° C. and held at this temperature for 15 minutes. The cooled product was then washed twice with water, dried over anhydrous sodium sulphate and finally distilled, using a fractionating column. A fraction distilling at 62–64° C./9 mm. Hg was collected, this being 1:2-propylene sulphite, a colourless liquid with a pleasant ethereal smell, sparingly soluble in water and having a specific gravity of 1.287.

A further quantity of an aqueous urea-formaldehyde syrup as described in Example 1 was prepared. To this was added, with stirring, 5.6 parts 1:2 propylene sulphite and 20 parts hexamethylene tetramine. The syrup was then mixed with 660 parts alpha cellulose and oven-dried at 80° C. The dry material was ground in a pebble-mill with 10 parts zinc stearate and granulated on hot differential rolls.

The granular moulding composition gave a well-cured B.S. 1322 water absorption disc—⅛" thick—when moulded for 1½ minutes at 300° F. The ease of flow of the powder was determined by placing a standard weight of powder in a flat disc mould and, after pressing under standard conditions of temperature and pressure, measuring the moulded disc thickness (as described in "Aminoplastics" by C. P. Vale, published by Cleaver-Hume Press Ltd., 1950, page 112). The test was repeated with the moulding composition after 8 weeks' storage at 100° F. Only a slight increase in disc thickness was observed.

*Example 3*

A sample of 2:3-butylene sulphite was prepared by the procedure described in the previous example, starting with freshly distilled 2:3-butylene glycol.

The product, obtained in good yield, was a colourless liquid with a pleasant ethereal smell distilling at 71–73° C./7 mm. Hg. It has a specific gravity of 1.216 and was only sparingly soluble in water.

Using the same weights of urea and formalin as in Example 1, a urea-formaldehyde syrup was prepared to which was added 6.3 parts 2:3-butylene sulphite and 40 parts hexamethylene tetramine. The syrup was mixed with alpha cellulose dried, ground and granulated as described in Example 1.

The granular product gave blister-free beakers after curing for 20 seconds at 300° F. Fully cured B.S. 1322 water absorption discs—⅛" thick—were obtained after 1 minute cure at 300° F. The powder retained its flow reasonably well on storage at 100° F.

*Example 4*

A sample of erythritol sulphite was prepared as follows: 12 parts erythritol (0.1 mol) were refluxed with 48 parts thionyl chloride (0.4 mol) for 3 hours. A clear, brown solution was obtained. This was poured into a cold, 5% solution of sodium carbonate and a white crystalline solid separated. This was filtered, washed thoroughly with water and dried at 50° C. The product melted at 93° C. Analysis by hydrolysis, oxidation to sulphate and precipitation as barium sulphate indicated the presence of 98% of the sulphur required for a disulphite.

A urea-formaldehyde syrup was prepared by the method described in Example 1. 2422 parts of the syrup were mixed with 660 parts alpha cellulose and the mix oven-dried at 80° C. The dried material was ground in a pebblemill with 5 parts erythritol sulphite and 10 parts zinc stearate and then granulated on hit differential rolls. The product gave a blister-free beaker when cured for 25 seconds at 300° F.

*Example 5*

A sample of pentaerythritol sulphite was prepared by refluxing 27.2 parts pentaerythritol (0.2 mol) and 100 parts thionyl chloride (0.83 mol) for 2½ hours on a water bath. The solid separating was filtered from excess thionyl chloride, washed thoroughly with cold ethyl alcohol and dried at about 40° C. The product melted at 152° C. and, on analysis, was found to contain 97% of the sulphur required for a disulphite.

This preparative method is essentially that described by L. Orthner in Berichte 1928, 61, page 118.

A urea-formaldehyde syrup was prepared as in Example 1. 2422 parts of this syrup were mixed with 660 parts alpha cellulose and the mix dried in an oven at 80° C. The dried product was ground in a pebblemill with 5 parts pentaerythritol sulphite and 10 parts zinc stearate. The fine powder so obtained was granulated on heated differential rolls.

Beakers were moulded without blisters in 25 seconds at 300° F. B.S. 1322 water absorption discs—⅛" thickness—were fully cured in 1½ minutes at 295° F.

*Example 6*

948 parts melamine, 1219 parts neutralised 37% (w./w.) formalin (pH 7.0–7.5) and 433 parts water were heated together with stirring. At 80° C. the melamine rapidly dissolved and the clear solution obtained was kept at this temperature until one drop placed in a large volume of ice-cold water gave a cloud of hydrophobe resin. The solution was cooled to 60° C. and mixed in a Werner-Pfleiderer type mixer with 660 parts alpha cellulose pulp until a homogeneous wet crumb was obtained. This was transferred to trays and oven-dried until brittle. It was then ground down in a pebble mill until less than 1% failed to pass through a 30 mesh sieve. The fine powder was divided into two parts, A and B. To A was added 0.5% zinc stearate and to B was added 0.5% zinc stearate and 0.25% ethylene sulphite. The two powders were then ground separately in pebble mills for a further hour and were then granulated on hot differential rolls at 110° C.

It was found that well-cured, blister-free beakers could be obtained from B with 55 seconds cure (at 300° F.). A, however, required 75 seconds at the same temperature. It was also found that satisfactory discs, ⅛" thick, could be moulded from B giving 1¼ minutes curing time at 300° F. A required between 1¾ and 2 minutes cure at the same temperature.

Example 7

1178 parts benzoguanamine and 1532 parts neutralised 37% w./w. formalin were heated to the boil under reflux, with stirring, until the benzoguanamine had completely dissolved. The solution was cooled to 70° C. and 542 parts industrial methylated spirits (64 O.P.) were added. The whole was then mixed with 825 parts alpha cellulose pulp in a Werner-Pfleiderer type mixer and part of the homogeneous wet crumb obtained was transferred on trays to an oven at 90° C. (A). To the remainder of the crumb was added 1% ethylene suphite and mixing continued for 15 minutes. This material was also transferred to trays and oven dried (B). When drying was complete, A and B were separately ground in pebble-mills with 0.5% zinc stearate and finally granulated on hot differential rolls. At 110° C. A was extremely slow curing and required 10 minutes cure at 300° F. to give a good blister-free beaker. B gave a similar beaker in 3½ minutes at the same temperatures.

Example 8

A sample of catechol sulphite was prepared as follows: 110 grams catechol (1 mol) were dissolved in 200 ccs. benzene and the solution heated to 70° C. 119 grams thionyl chloride (1 mol) were slowly added to the solution, hydrogen chloride being evolved and a blue solid precipitating. The temperature was held at 55° C. for 2 hours. The product was then cooled, filtered, and finally distilled. A fraction boiling 66.5–70° C. at 3 mm. Hg pressure was collected. This was a colourless, highly lachrymatory liquid, identified as catechol sulphite.

An aqueous urea-formaldehyre precondensate was prepared by dissolving 856 parts urea in 1470 parts neutral formalin (37% formaldehyde w./w.). The solution was stirred at 40° C. for 30 minutes, then filtered and cooled. The clear syrup so obtained was mixed with 660 parts alpha cellulose pulp and 10 parts zinc sterate in a Werner-Pfleiderer type mixer until a fine homogeneous crumb was obtained. The wet crumb was dried on trays at 80° C. and then divided into two parts which were ball milled respectively with (a) 0.5% catechol sulphite, 1.0% hexamine and 0.5% zinc stearate lubricant (b) 0.5% zinc stearate. The fine powders so obtained were granulated by passing once through the nip of differential rolls maintained at 80° C. The products were finally passed through a rotary cutter.

Good blister free beaker mouldings were obtained from (a) after 20 seconds cure at 300° F.; (b) on the other hand did not give satisfactory beakers even after 60 seconds cure.

Example 9

A sample of mono ortho cresyl glyceryl ether sulphite was prepared as follows: 72.8 gms. ether (0.4 mol) were dissolved in 100 ccs. chloroform and 72 gms. thionyl chloride (0.6 mol) added slowly. The mixture was refluxed for 2 hours until no more hydrogen chloride evolved. On distillation, a large fraction boiling 188–194° C./16.5 mm. Hg was collected. This, on redistillation, gave a clear, almost colourless liquid boiling 168–172° C. at 5 mm. pressure, which on analysis proved to be substantially the sulphite of mono ortho cresyl glyceryl ether.

An aqueous urea-formaldehyde precondensate was prepared using the weights and method described in Example 1 and to the syrup was added 10.6 parts mono ortho cresyl glyceryl ether sulphite and 40 parts hexamethylenetetramine. The syrup was then mixed with 660 parts alpha cellulose pulp and 10 parts zinc stearate in a Werner-Pfleiderer type mixer until a fine crumb was obtained. The material was dried on trays in an oven at 80° C. and then ball-milled with a further 10 parts zinc stearate. The fine powder so obtained was granulated by passing through the nip of differential rolls maintained at 80° C. The product was finally passed through a rotary cutter.

The granular product gave blister-free beaker mouldings when cured for 20 seconds at 300° F. and fully cured water absorption discs (B.S. 1322) were obtained after 1½ minutes cure at 290° F.

Example 10

A sample of di-n-butyl sulphito-tartrate was prepared as follows: 82.4 gms. thionyl chloride (0.7 mol) were added slowly to 131 gms. di-n-butyl tartrate (0.5 mol). The temperature was raised to 50° C. and maintained for 50 hours. On distillation, a fraction boiling 180° C./4 mm. Hg was collected. The product was a colourless liquid which, on analysis, proved to be substantially di-n-butyl sulphito-tartrate.

An aqueous urea-formaldehyde precondensate was prepared by the method described in Example 8. 2326 parts of the syrup were mixed with 660 parts alpha cellulose pulp and 10 parts zinc stearate lubricant in a Werner-Pfleiderer type mixer until a homogeneous crumb was obtained. The wet crumb was dried on tray in an oven at 80° C. and then divided into two parts. These were ball-milled respectively with (a) 0.75% di-n-butyl sulphito-tartrate, 1.0% hexamine and 0.5% zinc stearate lubricant and (b) 0.5% zinc stearate. The fine powders so obtained were granulated by first passing through the nip of differential rolls, maintained at 80° C., and then through a rotary cutter.

Good, blister-free beaker mouldings were obtained from (a) after 25 seconds cure at 300° F. whereas from (b) unsatisfactory beakers were obtained even after 60 seconds cure.

Example 11

An aqueous urea-formaldehyde procondensate was prepared by dissolving 428 parts urea in 735 parts neutral formalin (37% formaldehyde w./w.). The solution was heated to 40° C. stirred for 30 minutes, filtered and cooled.

An aqueous melamine-formaldehyde precondensate was prepared by dissolving 474 parts melamine in 610 parts neutral formalin. The solution was brought to the boil, under reflux, and condensed until one spot of the syrup showed a permanent turbidity when dropped into a large volume of cold water. The syrup was then filtered and cooled to 70° C.

The two syrups were blended together and mixed with 660 parts alpha cellulose pulp and 10 parts zinc stearate lubricant in a Werner-Pfleiderer type mixer. The temperature was raised to 60° C. and mixing continued for 30 minutes until a homogeneous crumb was obtained. The wet crumb was dried on trays in an oven at 80° C. divided into two parts and ballmilled respectively with (a) 0.4% ethylene sulphite and 0.5% zinc stearate lubricant (b) 0.5% zinc stearate only. The fine powders so obtained were granulated by first passing through the nip of differential rolls heated at 80–90° C. and then through a rotary cutter.

Good, blister-free beaker mouldings were obtained from (a) after 35 seconds cure at 300° F. whereas from (b) a cure of 60 seconds at 300° F. was required.

Example 12

An aqueous melamine-formaldehyde syrup was made as follows:

567 grams of 37% w./w. formalin were neutralised to pH 7 to 7.5 with normal sodium hydroxide solution. 440 grams of melamine were added and the mixture heated rapidly with stirring to 90° C. After the melamine had completely dissolved, the solution was held at 90° C. under reflux until one drop placed in a large volume of ice-cold water gave a faint opalescent cloud. The syrup was cooled to 50° C. To it was added 150 grams of commercial monocresyl ether of glycerol, and the two stirred together until homogeneous. 1200 parts asbestine were introduced into a Werner-Pfleiderer type mixer and the resin syrup-plasticiser mixture added slowly. To the mix was added 20 grams zinc stearate. The materials were worked until homogeneous and then dried at about 60° C. until dry and brittle. The product was removed from the mixer, disintegrated and then dried for a further period at 80° C. in a thermostatically controlled oven, fitted with an air-circulating fan, until a suitable flow was obtained.

The product was divided into two parts. One part (a) was intimately mixed with 1% by weight of catechol sulphite, the preparation of which has been described in Example 8, and milled in a pebble mill for 2 hours. The second part (b) was milled for 2 hours in a similar way but without addition of catechol sulphite. (a) and (b) were respectively granulated by passing through the nip of a pair of differential rolls maintained at 80° C., and disintegrating the products obtained. Beakers were moulded from (a) and (b) at 300° F. when it was found that while good blister-free mouldings could be obtained from (a) in 75 seconds a curing time of 140 seconds was required to obtain a satisfactory moulding from (b).

What is claimed is:

1. Hot press moulding compositions comprising at least one amine aldehyde resin and, at most, about 5% by weight, based on the dry weight of the total moulding composition, of a monomeric cyclic sulphite having the formula

wherein R is a bridging alkylene group of from 2 to 3 carbon atoms in the bridge.

2. Compositions according to claim 1, wherein the cyclic sulphite is present in an amount of at most 2% by weight, based on the dry weight of the total moulding composition.

3. Compositions according to claim 1, wherein the monomeric compound contains more than two free hydroxyl groups, unsulphited hydroxyl groups being esterified.

4. Compositions according to claim 1, wherein the monomeric compound contains more than two free hydroxyl groups, unsulphited hydroxyl groups being etherified.

5. Compositions according to claim 1, wherein the monomeric compound contains more than two free hydroxyl groups, at least one of the remaining unsulphited hydroxyl groups being esterified and at least one of them being etherified.

6. Compositions according to claim 1, comprising also an inert filler.

7. Compositions according to claim 1 comprising also a cellulosic filler.

8. Hot press moulding compositions comprising at least one amine aldehyde resin and, at most, about 5% by weight, based on the dry weight of the total moulding composition, of a monomeric cyclic sulphite selected from the group consisting of ethylene sulphite, 1,2-propylene sulphite, 2,3-butylene sulphite, erythritol sulphite, pentaerythritol sulphite, catechol sulphite, cresyl glyceryl ether sulphite and di-n-butyl-sulphite-tartrate.

9. Compositions according to claim 8, the resin being the reaction product of an aldehyde with a compound selected from the group consisting of urea, thiourea, melamine, dicyandiamide, diaminotriazines, acetoguanamine and benzoguanamine.

10. The method of preparing aminoplastic moulding compositions containing accelerators which comprises incorporating at least one amine aldehyde resin with at most 5% by weight, based on the dry weight of the total moulding composition, of a cyclic sulphite having the formula

wherein R is a bridging alkylene group of from 2 to 3 carbon atoms in the bridge.

11. The method according to claim 10 which includes the further step of hot pressing the moulding composition.

References Cited in the file of this patent

UNITED STATES PATENTS

| | | |
|---|---|---|
| 1,905,999 | Ellis | Apr. 25, 1933 |
| 2,343,497 | Cosgrove | Mar. 7, 1944 |
| 2,413,624 | Harris | Dec. 31, 1946 |

OTHER REFERENCES

Journal of the American Chemical Society, 1947, 69, pages 1952–1954.